United States Patent
Sun et al.

(10) Patent No.: US 10,263,660 B2
(45) Date of Patent: Apr. 16, 2019

(54) METHODS AND APPARATUS FOR CONSTRUCTION OF SCMA CODEBOOKS

(71) Applicant: QUALCOMM Incorporated, San Diego, CA (US)

(72) Inventors: Haitong Sun, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 15/588,431

(22) Filed: May 5, 2017

(65) Prior Publication Data

US 2018/0048349 A1 Feb. 15, 2018

Related U.S. Application Data

(60) Provisional application No. 62/373,838, filed on Aug. 11, 2016.

(51) Int. Cl.
*H04B 1/00* (2006.01)
*H04B 1/7075* (2011.01)
(Continued)

(52) U.S. Cl.
CPC ........ *H04B 1/7075* (2013.01); *H04J 13/0007* (2013.01); *H04J 13/10* (2013.01);
(Continued)

(58) Field of Classification Search
CPC .... H04B 1/7117; H04B 1/712; H04B 1/7107; H04B 1/7115; H04B 1/707; H04B 1/709;
(Continued)

(56) References Cited

U.S. PATENT DOCUMENTS

2014/0369434 A1 12/2014 Taherzadehboroujeni et al.
2016/0049999 A1 2/2016 Taherzadeh Boroujeni et al.
(Continued)

FOREIGN PATENT DOCUMENTS

CN 105553913 A 5/2016
CN 105681235 A 6/2016

OTHER PUBLICATIONS

Bao J., et al., "Spherical Codes for SCMA Codebook," IEEE 83rd Vehicular Technology Conference (VTC SPRING), May 15, 2016, pp. 1-5, XP032918724 [retrieved on Jul. 5, 2016].
(Continued)

*Primary Examiner* — Zewdu A Kassa
(74) *Attorney, Agent, or Firm* — Loza & Loza, LLP

(57) ABSTRACT

Disclosed are methods and apparatus used in wireless communications. The methods and apparatus establish a codebook for use in sparse code multiple access (SCMA) encoded communications, in particular. The SCMA codebook is configured to set the codebook for at least one layer (i.e., a user) to include a constellation of points having a first grouping of constellation points located at first radial distance from an origin in a complex plane and a second grouping of constellation points located at a second radial distance from the origin. This codebook arrangement provides increased gains at receivers by optimizing the constellation shape to improve the distance between constellation points (i.e., SCMA codebook performance), and in particular more robust performance when encountering amplitude and phase misalignment in uplink (UL) multiple access.

30 Claims, 9 Drawing Sheets

(51) Int. Cl.
*H04J 13/00* (2011.01)
*H04J 13/10* (2011.01)
*H04L 1/00* (2006.01)
*H04W 72/04* (2009.01)
*H04L 25/00* (2006.01)

(52) U.S. Cl.
CPC .......... *H04L 1/0042* (2013.01); *H04L 1/0057* (2013.01); *H04L 25/00* (2013.01); *H04W 72/0466* (2013.01); *H04B 2201/698* (2013.01); *H04B 2201/7073* (2013.01); *H04J 2013/0096* (2013.01)

(58) Field of Classification Search
CPC ..... H04B 1/7075; H04B 1/7093; H04J 13/10; H04J 13/0007; H04L 1/0042; H04L 1/0057; H04W 72/0466
USPC .................................. 375/144, 142, 141, 130
See application file for complete search history.

(56) References Cited

U.S. PATENT DOCUMENTS

2016/0254937 A1   9/2016  Bayesteh et al.
2016/0374037 A1* 12/2016  Lee ...................... H04W 12/10
2017/0127423 A1*  5/2017  Boroujeni ......... H04W 72/0466
2018/0013525 A1*  1/2018  Baligh ................... H04W 4/70

OTHER PUBLICATIONS

International Search Report and Written Opinion—PCT/US2017/046367—ISA/EPO—dated Nov. 7, 2017.
Wang J., et al., "A Novel Codeword Grouped SCMA", IEEE 6th International Symposium on Microwave, Antenna, Propagation, and EMC Technologies (MAPE), Oct. 28, 2015, pp. 753-758, XP032923350, DOI: 10.1109/MAPE.2015.751 0426 [retrieved on Jul. 12, 2016].

\* cited by examiner

METHODS AND APPARATUS FOR CONSTRUCTION OF SCMA CODEBOOKS

CLAIM OF BENEFIT UNDER 35 U.S.C. § 119

The present Application for Patent claims the benefit of U.S. Provisional Application No. 62/373,838 entitled "METHODS AND APPARATUS FOR CONSTRUCTION OF SCMA CODEBOOKS" filed Aug. 11, 2016, assigned to the assignee hereof and hereby expressly incorporated by reference herein.

TECHNICAL FIELD

The present application relates generally to wireless communication systems, and more particularly, to methods and apparatus for construction or forming of Sparse Code Multiple Access (SCMA) codebooks for non-orthogonal multiple access.

INTRODUCTION

Sparse Code Multiple Access (SCMA) is a non-orthogonal multiple access scheme that has been proposed for fifth generation (5G) communication standards. SCMA utilizes a non-orthogonal waveform that engenders a multiple access scheme. In particular, incoming coded bits are directly mapped to multi-dimensional sparse codewords selected from predefined and layer-specific SCMA codebooks. Effectively in SCMA, the modulation process, such as Quadrature Amplitude Modulation (QAM) mapping, and a code spreading process, such as spreading that is effectuated in Code Division Multiple Access (CDMA) or low density signature (LDS) in CDMA, are merged together to directly map a set of bits to a complex sparse vector, which is the codeword.

Proposed SCMA schemes include layer mapping similar to Long Term Evolution (LTE), where one or multiple SCMA layers can be assigned to a user or data stream. SCMA is different from LTE, however, in that for an SCMA layer, mapping from information bits to codewords is performed, i.e., the SCMA modulator maps input bits to a complex multi-dimensional codeword selected from a layer-specific SCMA codebook. The SCMA codewords are sparse, meaning that only a few of their entries are non-zero and the rest are zero. All SCMA codewords corresponding to a SCMA layer have a unique location of non-zero entries, which may be referred to as a sparsity pattern. Additionally, every layer may have a specific SCMA codebook set.

SCMA allows the sparse codewords of multiple layers of devices to be overlaid in code and power domains and carried over shared time-frequency resources. In addition, the system can be overloaded where the number of multiplexed layers is more than a spreading factor (or equivalently the length of a codeword). Also, because SCMA replaces QAM modulation and LDS spreading with multi-dimensional codebooks, shaping or coding gains of multi-dimensional constellations is realized. Hence, SCMA improves the spectral efficiency through multi-dimensional shaping gain of codebooks while still providing the benefits of LDS, for example, in terms of overloading and moderate complexity of detection.

It is noted that for uplink (UL) communications, in particular, SCMA codebook design is more challenging as the amplitude and phases between different layers are typically not perfectly aligned if layers are transmitted from different users (e.g., different UEs). Accordingly, there exists a need to design SCMA codebooks with increased robust performance under amplitude and phase misalignment, particularly for UL multiple access.

SUMMARY

According to an aspect, a method of wireless communication is disclosed. The method includes establishing a codebook for use in sparse code multiple access (SCMA) communication. In particular, the codebook used for mapping input bits for transmission to a codeword features setting the codebook for at least one layer to include a constellation of points having a first grouping of constellation points located at first radial distance from an origin in a complex plane. Furthermore, the codebook features a second grouping of constellation points located at a second radial distance from the origin.

In another aspect, an apparatus for wireless communication is disclosed, the apparatus including a processor, a transceiver communicatively coupled to the at least one processor, and a memory communicatively coupled to the at least one processor. The processor is configured to establish a codebook for use in sparse code multiple access (SCMA) communication including establishing a modulation used to construct an SCMA codebook configured as a constellation of points having a first group of points positioned at first radial distance from an origin in a complex plane and a second group of points positioned at a second radial distance from the origin.

In yet another aspect, a non-transitory computer-readable medium storing computer-executable code is disclosed. The medium comprises code for causing a computer to establish a codebook for use in sparse code multiple access (SCMA) communication including establishing a modulation used to construct an SCMA codebook configured as a constellation of points having a first group of points located at first radial distance from an origin and a second group of points located at a second radial distance from the origin.

According to another aspect, an apparatus for wireless communication is disclosed. The apparatus includes means for establishing a codebook for use in sparse code multiple access (SCMA) communication. The means for establishing the codebook further includes means for establishing a modulation used to construct an SCMA codebook configured as a constellation of points having a first grouping of constellation points located at first radial distance from an origin in a complex plane and a second grouping of constellation points located at a second radial distance from the origin.

DETAILED DESCRIPTION

The detailed description set forth below in connection with the drawings is intended as a description of various configurations and is not intended to represent the only configurations in which the concepts described herein may be practiced. The detailed description includes specific details for the purpose of providing a thorough understanding of various concepts. It will be apparent to those skilled in the art, however, that these concepts may be practiced without these specific details. In some instances, well-known structures and components are shown in block diagram form in order to avoid obscuring such concepts.

In order to increase robust performance under amplitude and phase misalignment, particularly for UL multiple access, the present methods and apparatus provide an SCMA codebook design that uses a constellation of mapped bit values in real and imaginary space (e.g., in-phase I and quadrature Q) that has a same shape across the various layers for an SCMA scheme, but where different bit mapping is utilized between different non-zero entries. Additionally, the shape of the constellation is optimized to improve the performance of the SCMA codebook. It is noted that one metric for determining the improved performance of the SCMA codebook is an improved (i.e., reduced) normalized distance of points in the constellation from a particular chosen point (e.g., the point representing value 0, such as the binary value "000" for a three-bit value in a three-bit-per-layer system).

Figure 1:
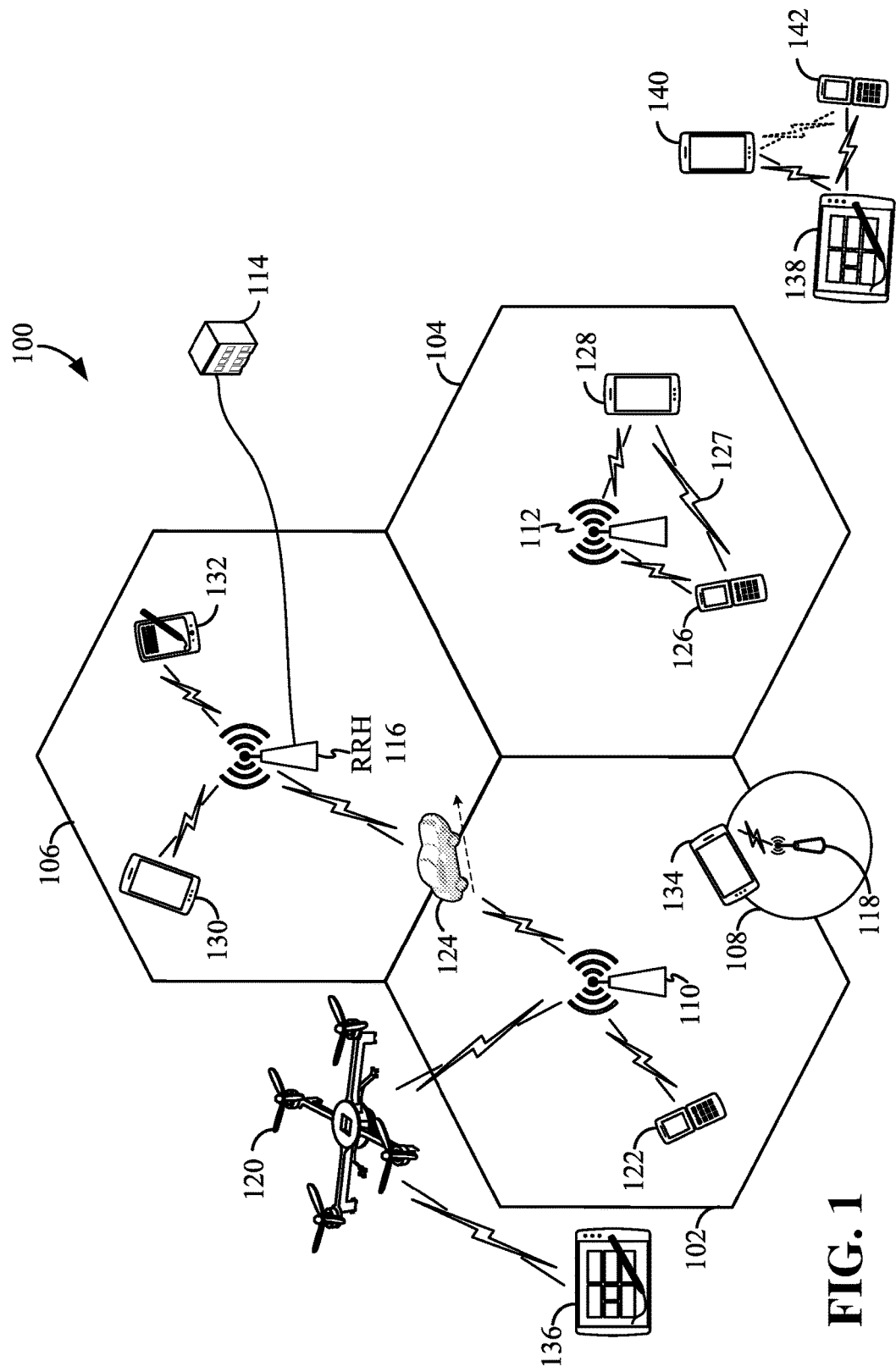
FIG. 1 is a conceptual diagram illustrating an example of an access network.

The various concepts presented throughout this disclosure may be implemented across a broad variety of telecommunication systems, network architectures, and communication standards. Referring to FIG. 1, as an illustrative example without limitation, a simplified schematic illustration of an access network 100 is shown.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, gNB, or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, gNB, etc.) which may overlap with one or more macrocells. In this example, the cell 108 may be referred to as a small cell, as the low-power base station 118 supports a cell having a relatively small size. Cell sizing can be done according to system design as well as component constraints. Those skilled in the art will understand that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a mobile or airborne node 120 such as a quadcopter or drone that may be configured to function as a base station. That is, in some examples, a cell may not necessarily be stationary, and the geographic area of the cell may move according to the location of a mobile base station such as the mobile node 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense, small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a scheduling or scheduled entity, or some other suitable terminology. A UE may be an apparatus that provides a user with access to network services.

Within the present document, a "mobile" apparatus need not necessarily have a capability to consistently or constantly move, and may be deployed in situations where such devices become stationary. The term mobile apparatus or mobile device broadly refers to a diverse array of devices and technologies. For example, some non-limiting examples of a mobile apparatus include a mobile, a cellular (cell)

phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., mobile node 120) may be configured to function as a UE. For example, the mobile node 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexing (OFDM) waveform, carries one resource element (RE) per subcarrier. A slot may carry 7 or 14 OFDM symbols in a couple of examples. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), OFDM, sparse code multiplexing (SCM), or other suitable multiplexing schemes.

Additionally, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
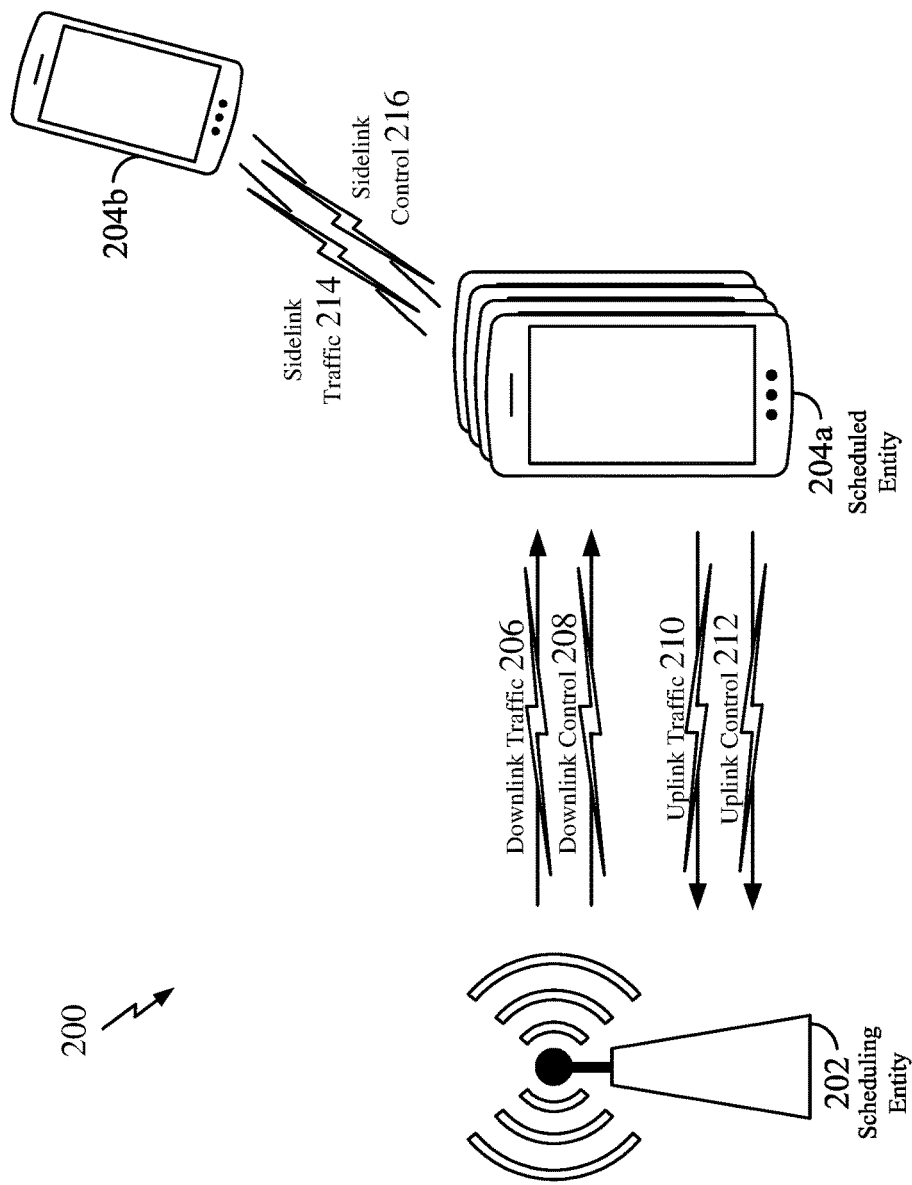
FIG. 2 is a block diagram conceptually illustrating an example of a scheduling entity communicating with one or more scheduled entities according to some embodiments.

Accordingly, in a wireless communication network with scheduled access to time-frequency resources and having a cellular configuration, a P2P configuration, or a mesh configuration, a scheduling entity and one or more scheduled entities may communicate utilizing the scheduled resources. Referring to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink (DL) traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information including, but not limited to, scheduling grants, synchronization or timing information, or other control information from another entity in the wireless communication network such as the scheduling entity 202.

The scheduling entity 202 may broadcast control information 208 including one or more control channels, such as a PBCH, a PSS, an SSS, a physical control format indicator channel (PCFICH), a physical hybrid automatic repeat request (HARQ) indicator channel (PHICH), and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable time intervals (e.g., transmission time intervals (TTIs) or similar constructs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the time intervals (e.g., TTIs) for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or a decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels illustrated in FIG. 2 are not necessarily all of the channels that may be utilized between a scheduling entity 202 and scheduled entities 204, and those of ordinary skill in the art will recognize that other carrier or channels may be utilized in addition to those illustrated, such as other traffic, data, control, and feedback channels. It is noted that the transmission schemes utilized by the scheduling entity 202 and the scheduled entities 204 may include sparse code multiple access (SCMA), time division multiple access (TDMA), code division multiple access (CDMA), frequency division multiple access (FDMA), orthogonal frequency division multiple access (OFDMA), or other suitable multiple access schemes.

Figure 3:
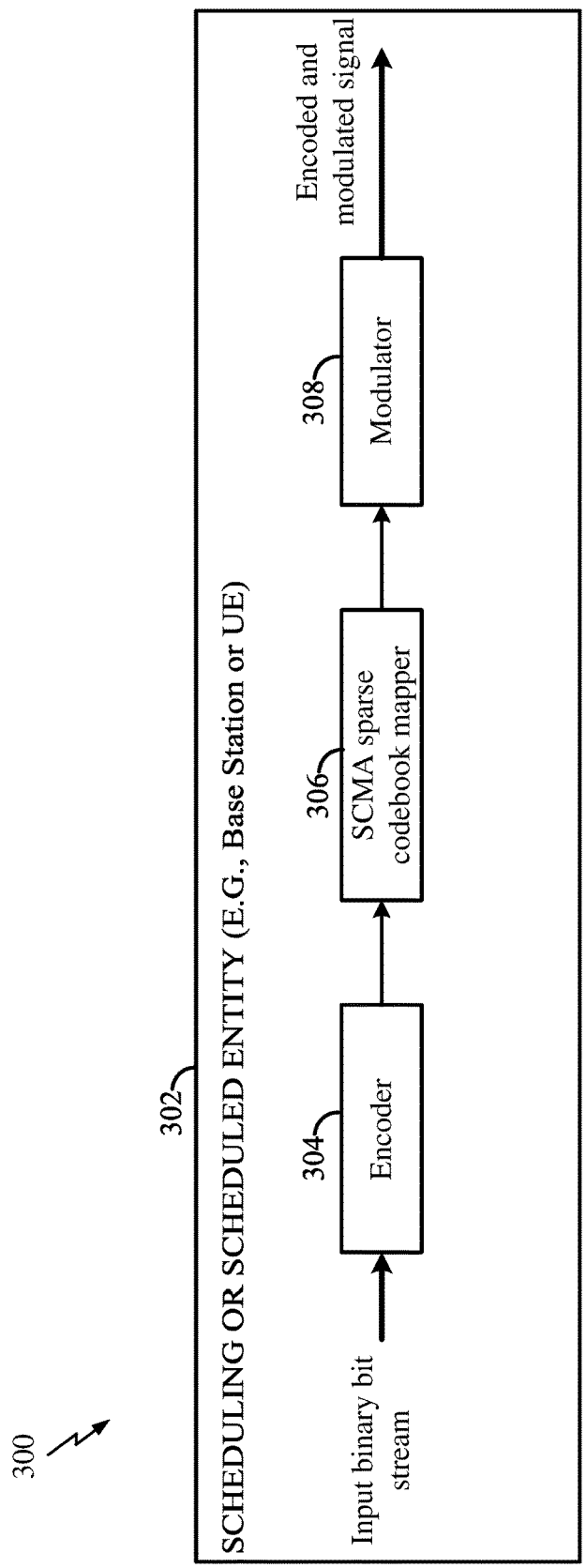
FIG. 3 illustrates an exemplary transmitter system for transmission of data bits using SCMA.

With regard to SCMA schemes, in particular, when transmitting signals a transmitter in a communication device, whether in a scheduling entity 202 or a scheduled entity 204 as examples, employs an SCMA codebook that allows encoded bits to be mapped to a codeword for SCMA transmission. FIG. 3 illustrates an exemplary transmitter system model 300 for transmission of bits using SCMA. The transmitter system 300 may be employed within a device 302 such as a scheduling entity or a scheduled entity. As illustrated, the transmitter system 300 receives a data stream of binary bits in an encoder 304 from a processor (not shown), such as a digital signal processor (DSP) as one example. In an aspect, the encoder 304 may employ forward error correction (FEC) encoding, turbo encoding, low-density parity-check (LDPC) coding, or any other suitable encoding. The encoded bits are passed to an SCMA sparse codebook mapper 306 for mapping of the bits to a codeword (and attendant constellation points) based on the SCMA codebook. In an aspect, the coded bits of the data stream are directly mapped to a codeword from a codebook built based on a multi-dimensional constellation, which is constellation based on at least two non-zero entries in multiple complex dimensions (i.e., dimensions containing both in-phase (I) and quadrature (Q)). The codeword output from mapper 306 is input to a modulator 308 for modulation of the codeword based on any number of known modulation schemes for transmission. In one example, modulator 308 may be configured as an OFDM modulator where SCMA codewords are combined over OFDM tones and then symbols may be transmitted as SCMA blocks, similar to the resource block concept known in LTE. It is noted that the multi-dimensional modulation afforded by SCMA mapping provides lower detection complexity by allowing for a lower number of projection points compared to linear spreading, for example.

The mapper 306 is configured to jointly modulate and spread the coded bits, as mentioned before. In an example, the SCMA mapper 306 utilizes low density spreading, which is used in LDS (low density signature) techniques in CDMA and may also be referred to as "sparse spreading." Of note, the SCMA mapper 306 may employ layer mapping that is similar to LTE, where one or more SCMA layers may be assigned to a user/data stream (i.e., to a particular UE). Different from LTE, however, is that at each SCMA layer the SCMA mapper 306 maps from information bits to codewords (i.e. the SCMA mapper 306 maps input bits to a complex multi-dimensional codeword selected from a layer-specific SCMA codebook). Moreover, the SCMA codewords are sparse, where only a few of their entries are non-zero and the rest of the entries are zero. Typically, all SCMA codewords corresponding to an SCMA layer have a unique location of non-zero entries, referred to as the sparsity pattern.

According to a further aspect, the SCMA mapper 306 is configured to map the encoded data bits to a complex multi-dimensional codeword selected from a layer-specific SCMA codebook. Typically, all SCMA codewords that correspond to a particular SCMA layer will have a unique location of non-zero entries according to the particular sparsity pattern. The sparsity patterns of all the layers can be represented by a signature matrix S, such as the matrix shown below:

$$S = \begin{bmatrix} 1 & 0 & 1 & 0 & 1 & 0 \\ 0 & 1 & 1 & 0 & 0 & 1 \\ 1 & 0 & 0 & 1 & 0 & 1 \\ 0 & 1 & 0 & 1 & 1 & 0 \end{bmatrix}$$

In the exemplary signature matrix above, each layer is represented by a column in the matrix. Thus, in this example, the number of columns is six (6), and therefore the number of layers is six. Since each layer may represent a transmitting device (e.g., a UE device), the signature matrix may represent six devices. Additionally, since there are four (4) rows in the matrix, the spreading length will be four (4), where each row represents a band or subband of frequencies. Furthermore, in the signature matrix, a value of "1" means this is a non-zero entry, and a value of "0" means this is a zero entry. In an aspect, there are two (2) non-zero entries for each SCMA layer. Given the particular signature matrix S above, mapping on only the two non-zero entries would be required for each layer. As will be appreciated by those skilled in the art, since there is more than one non-zero value in each row, this means that the layers (e.g., transmitting devices) will utilize the same frequencies or tones for transmission, and there will be non-orthogonal signal superposition of multiple symbols from different users on each resource element (RE), which is the frequencies or tones available for transmission in an SCMA block, which is similar to the resource block concept in LTE.

Figure 4:
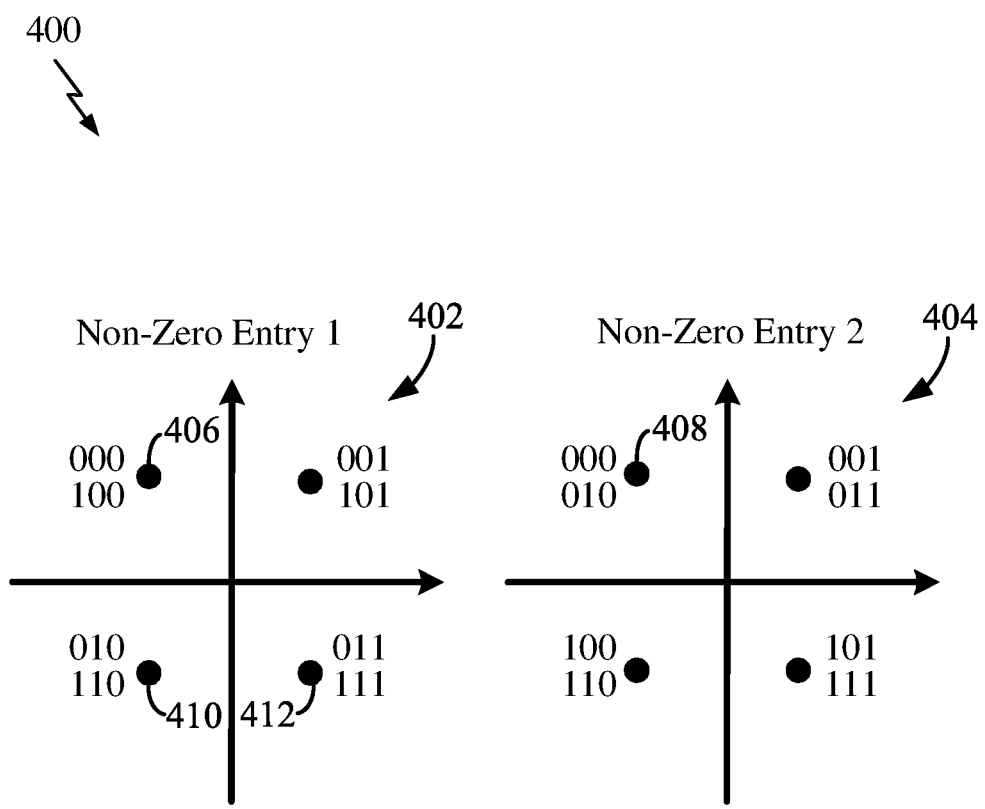
FIG. 4 is a plot of a known example of an SCMA codebook constellation.

In an example of a known 3-bit mapping scheme on the two non-zero entries, FIG. 4 illustrates an exemplary 8-point codebook 400 (or multi-dimensional constellation) in a complex or I-Q plane. As may be seen, the first non-zero entry constellation 402 includes 4 constellation points each representing one of two 3 bit values for representing numbers zero through 7 (i.e., 000 through 111). Each constellation point has an in-phase I or real component and a quadrature Q or imaginary (i.e., "j" where $j=\sqrt{-1}$) component. Similarly, the second non-zero entry constellation 404 also includes four (4) constellation points each representing one of two 3-bit values for also representing numbers zero through 7 (i.e., 000 through 111). As may be further seen in FIG. 4 the different first and second entries have respective constellations that share the same representation of one of the bit values, but have a different bit value for the second value. For example, the bit value for the constellation point 406 in the upper left quadrant of constellation 402 may represent bit values "000" and "100", whereas the constellation point 408 in the upper left quadrant of constellation 404 may represent bit values "000" and "010."

Still further, the constellation points within a non-zero entity may be Gray coded where only one bit change occurs between points in the constellation. For example, only one bit change occurs in the values from point 406 to point 410 (i.e., 000 to 010 or 100 to 110), or from point 410 to point 412 (i.e., 010 to 011 or 110 to 111). In another example that is not illustrated in FIG. 4, the constellation points from one layer may be Gray coded with respect to constellation points in another layer.

It is noted that for UEs, in particular, each UE may choose an SCMA codebook on their own. When there are multiple UEs that are active at the same time, codebook collisions may occur if one or more of the multiple UEs transmit with the same codebook. In the example above and assuming six active UEs (e.g., UE1 through UE6), it is noted that no collisions would occur between the UEs with the particular signature matrix S being used by all of the UEs. If the UEs choose the codebook on their own, however, collisions may occur. For example, UE1 and UE2 may choose a first codebook from the matrix above, UE3 and UE4 choose a third codebook from the matrix above, and UE5 and UE6 choose a fifth codebook from the matrix above. In such case, the signature matrix (denoted as $S_1$) could be given by the following matrix:

$$S_1 = \begin{bmatrix} 1 & 1 & 1 & 1 & 1 & 1 \\ 0 & 0 & 1 & 1 & 0 & 0 \\ 1 & 1 & 0 & 0 & 0 & 0 \\ 0 & 0 & 0 & 0 & 1 & 1 \end{bmatrix}$$

Referring back to FIG. 3, it further noted that the transmission model 300 may further include an additional modulator 306, which may be an OFDM modulator in one example. Additionally, the model 300 may be used for either UL and DL transmissions in either scheduling devices (e.g., base stations) or scheduled devices (e.g., UEs).

Figure 5:
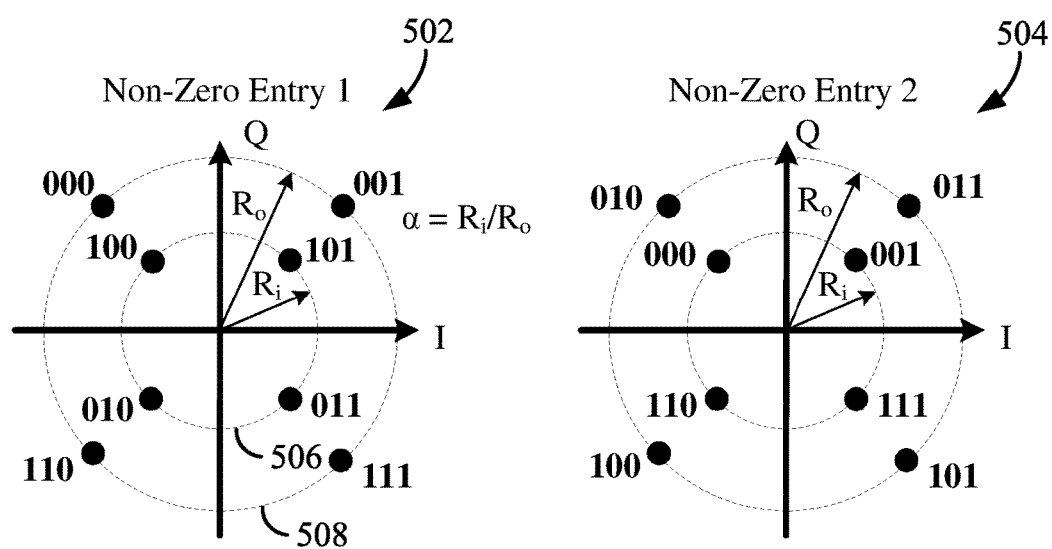
FIG. 5 is a plot of an example of an SCMA block diagram constructed in accordance with presently disclosed concepts.

In light of the foregoing, those skilled in the art will appreciate that the codebook design, as well as the type of receiver, is important in the implementation of SCMA to ensure robustness against codebook collision, as well as to mitigate the effects of amplitude and phase misalignment, particularly for UL multiple access FIG. 5 illustrates an exemplary codebook design 500 according to the present disclosure that improves the robustness of an SCMA system, particularly for UL multiple access, although not limited to such. As may be seen, the codebook 500 includes an 8-point constellation design with constellations 502 and 504 for the respective first and second non-zero entries. In this example, rather than using the same constellation points to represent two bit values, the 8 point constellation is arranged such that four (4) points are closer to an origin of the complex plane or I-Q Cartesian plot (e.g., a complex plane having both real or "in-phase" components in the I axis and imaginary or quadrature components in the Q axis) where four constellation points are arranged such that a first circle 506 passing through each of the points has an "inner radius" or radial distance of $R_i$. The other four constellation points are arranged such that a second circle 508 passing through each of the points has an "outer radius" or radial distance of $R_o$. A further property of the codebook 500 is that a ratio designated as "α" is defined as the ratio of the inner radius $R_i$ to the outer radius $R_o$ (i.e., $\alpha=R_i/R_o$). Stated another way, the inner radius is some percentage of the outer radius (i.e., $R_i=\alpha R_o$), where the value α will have a value less than one such that the inner radius $R_i$ is within the outer radius $R_o$. As would be evident to one skilled in the art, if the value of α is equal to one, the resultant constellation would be the same as the known constellation shown in FIG. 4 as the radii would be the same.

Thought of another way, the first four constellation points on the first inner radius 506 are part of a first grouping of constellation points, and the second four constellation points on the outer radius 508 are part of a second grouping of constellation point. Accordingly, at least one constellations point of the first grouping is fixed with respect to or relative to at least a second constellation point in the second grouping of constellation points according to the predetermined ratio α. Additionally, as is evident from FIG. 5, each of constellation points in the first grouping of constellation points is closer in absolute distance to an origin point on the plot of the constellation points than each of the points in the second grouping of constellation points.

Similar to the known example of FIG. 4, the constellation points of the present codebook 500 represent bit values, such as 3-bit values in the example shown, although those skilled in the art will appreciate that constellation may be applied to either 2 bit values or bit values greater than 3-bit values as well. Unlike the example of FIG. 4, however, each of the points in each of the first and second entries represents only one bit value. In a further aspect, it is noted that the bit values of the first and second groupings are Gray coded within each quadrant. For example, in the first non-zero entry 502, the bit value 000 at the outer radius in the upper left quadrant is only one bit difference or change from value 100 at the inner radius and in the same upper left quadrant. Furthermore, it is noted the bit values for correlative constellation points between the first and second non-zero entries 502, 504 are also Gray coded. For example, the constellation point on the outer radius in the upper right quadrant of the first non-zero entry represents a binary value "001" and the constellation point at the same location in the second non-zero entry represents a binary value of "011," which is only a one bit difference or change between the two values. Although not shown, the present codebook also contemplates Gray coding between the various layers of the signature matrix as well.

An example of coding that may be used for effectuating the codebook shown in FIG. 5 is given below:

J=sqrt(-1)
  s1=1+j; s2=1-j; s3=-1-j; s4=-1+j
  alpha=0.74;
  r1=[s4 s1 alpha*s3 alpha*s2 alpha*s4 alpha*s1 s3 s2];
  r1=r1/sqrt(mean(abs(r1).^2))/sqrt(3);
  r2=[alpha*s4 alpha*s1 s4 s1 s3 s2 alpha*s3 alpha*s2];
  r2=r2/sqrt(mean(abs(r2).^2))/sqrt(3);
  r0=zeros (1, 8);
  codebooks=cell(6, 1)
  codebooks(1)=[r1; r2; r0; r0];
  codebooks(2)=[r1; r0; r2; r0];
  codebooks(3)=[r1; r0; r0; r2];
  codebooks(4)=[r0; r1; r2; r0];
  codebooks(5)=[r0; r1; r0; r2];
  codebooks(6)=[r0; r0; r1; r2];

As may be seen from the code above, the r1 value for the first non-zero entry constellation defines the constellation having the constellation points s4 (−1+j) being representative of 000, s1 (1+j) being representative of 001, s3 (−1−j) being representative of 110, and s2 (1−j) being representative of 111, as examples. The other four constellation points are defined according the ratio α multiplied by the defined s1, s2, s3, and s4 values, and will be located on the inner radius 504 accordingly. Thus, α*s3 is representative of 010, α*s2 is representative of 011, α*s4 is representative of 100, and α*s1 is representative of 101. This coding achieves the Gray coding described above. Similarly, the r2 vector for the second non-zero entry is similarly defined to effect the constellation illustrated at 506 in FIG. 5. As may be seen in the exemplary code above, the value of α is set at 0.74, but this ratio value is not limited to such and may be adjusted either greater than or less than this value dependent on the particular system environment. Further, the codebooks in this example define a particular signature matrix with various zero and non-zero values. It is noted, however, that this matrix is merely exemplary and the disclosure is not limited to such.

It is further noted that the presently disclosed codebook provides an improvement of the performance of SCMA systems; namely the reduction in a normalized square distance from a reference point in the constellation (e.g., "000" constellation point) for at least some of the constellation points. This reduction has yielded an attendant improvement in the SCMA system performance that better approaches the Shannon limit for the system. In particular, the distance of the constellation may be normalized according for the energy of the constellation for determining a normalized square distance. Accordingly, in an aspect, if one assumes that the outer radius of the outer radius $R_o$ 508 is equal to a value of the square root of 2 and the inner radius $R_i$ 506 is equal to the square root of 2α, the average square energy of the constellation will be equal to a value of $1+\alpha^2$. This average energy derivation is based on the fact that four of constellation points on the outer radius in each non-zero entry have an energy of 2, while the other four constellation points on the inner radius have an energy of $(2\alpha)^2$. Thus, the average energy given the sum of the energies of all constellation points divided by the number of constellation points yields an average energy of $1+\alpha^2$. Accordingly, for the distance from the constellation point representing "000" to the point representing "010" in constellation 502, for example, the square distance is $3(1-\alpha)^2+(1+\alpha)^2$. The squared distance normalized would then be $4-4\alpha/(\alpha^2+1)$. Table 1 below illustrates the various normalized square distances for constellation 502, for example, as compared to the known code of FIG. 4 (e.g., constellation 402).

TABLE 1

| Bit value | Normalized Square Distance to 000 | |
|---|---|---|
| | Known Code (FIG. 4) | Presently disclosed Code |
| 001 | 4 | 4 |
| 010 | 2 | $4 - 4\alpha/(\alpha^2 + 1)$ |
| 100 | 2 | $4 - 4\alpha/(\alpha^2 + 1)$ |
| 011 | 6 | $4 + 4\alpha/(\alpha^2 + 1)$ |
| 101 | 6 | $4 + 4\alpha/(\alpha^2 + 1)$ |
| 110 | 4 | 4 |
| 111 | 8 | 8 |

As may be seen from Table 1 above, the normalized square distances from the constellation point 000 to the points representing 001, 110, and 111 are identical to known code of FIG. 4. With regard to distances to constellation points representing 011 and 101, for values of α less than one there is attendant reduction in the normalized square distance to 000, which has been shown to provide improvements to particular SCMA systems.

Figure 6:
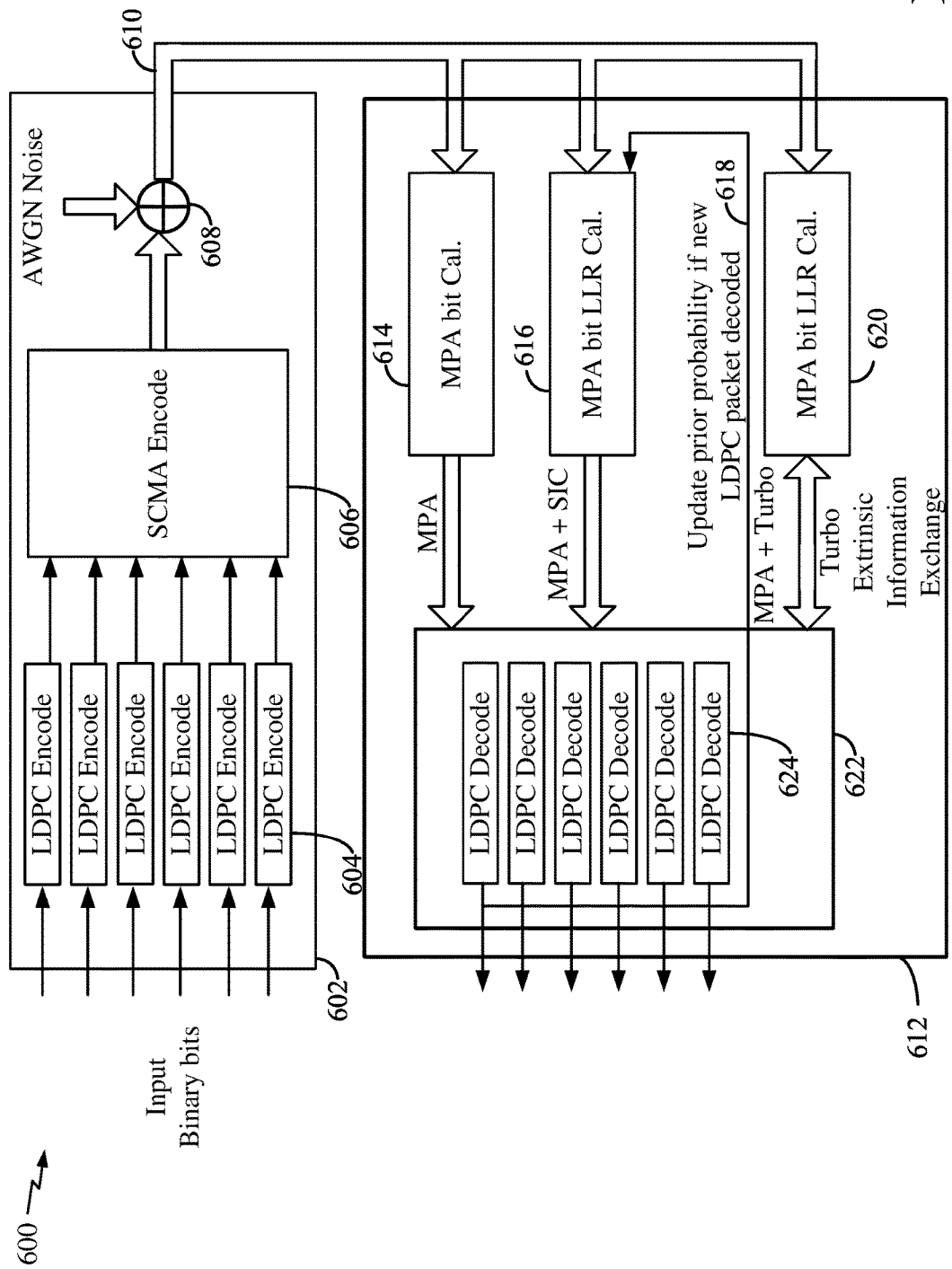
FIG. 6 illustrates a block diagram of a modeled transmitter and receiver system capable of transmitting and receiving SCMA codewords.

As an example of determining the improvement engendered by the presently disclosed SCMA codebook, a transceiver system using this codebook can be modeled and evaluated through the modeling of a transmitter with SCMA coding and various types of receiver configurations receiving the SCMA transmissions. FIG. 6 illustrates a block diagram 600 showing an exemplary modeled system of a transmitter and receiver in which the presently disclosed methods and apparatus for employing an SCMA codebook may be evaluated. On the transmitter side, FIG. 6 illustrates a transmitter 602 that may utilize encoding with forward error correction using low-density parity check (LDPC) codes, as one example, although not limited to such. In particular, a number of LDPC encoder blocks 604 are used. In one example, the rate of the LDPC encoder block 604 may be set at R=½, although various rates may be employed. The encoded bits are then SCMA modulated and spread with an SCMA encoder 606, although the transmitter 602 is not limited to such encoding. As part of the modeling of noise that may normally be present in a wireless interface, the insertion of added white Gaussian noise (AWGN) is also shown by addition block 608 adding the AWGN to the output of SCMA encoder 606 in FIG. 6. It is noted that the insertion of AWGN is illustrated here to merely show how an exemplary modelling set up estimates a real-world situation when trying to determine realistic testing results. Those skilled in the art will appreciate that an implemented transmitter would not utilize added AWGN.

On the receiver side of the modelled wireless interface 610, a receiver 612 includes at least three types of receiver configurations in the example of FIG. 6: (1) a low complexity message passing algorithm (MPA) receiver decoder 614 that computes bit log likelihood ratios (LLRs) (converted from symbol LLR) assuming no a priori information; (2) an MPA based decoder 616 with jointed serial interference cancellation (SIC) where initially the MPA has no symbol a priori information, but once a packet is decoded after LDPC decoding, then a priori information is fully known (See iterative feedback 618) and the MPA is rerun to update the LLR (and also where iteration stops when no new packet is decoded); and (3) a decoder 620 utilizing MPA with turbo decoding where turbo extrinsic information exchange occurs between the MPA (i.e., SCMA MPA) decoder 620 and an LDPC decoder 622 with LDPC decode elements 624 corresponding to the LDPC encode elements 604 in transmitter 602. The LDPC decoder 622 includes extrinsic information exchange (e.g., feedback) for at least the Turbo decoder 620. It is noted that the example of FIG. 6 is merely exemplary, and that the encoding and decoding schemes need not necessarily be limited to SCMA MPA and LDPC encoding and decoding for implemented the disclosed SCMA codebook methods and apparatus.

Based on the modelling of FIG. 6, if it is assumed that the SCMA codebook utilizes 6 layers, with 4 symbols per layer and 3 bit/layer coding, Table 2 illustrates the reduced distance from the theoretical Shannon limit that is gained using a codebook having the ratio $\alpha$ set to a value of 0.74 as compared with the known SCMA codebook illustrated in FIG. 4 for at least a couple power control scenarios. The distance is expressed in decibels (dB), and Table 2 illustrates a significant gain over a known codebook, particularly when the power per layer is equal. Even with unequal power per layer, the present codebook provides improvement of SCMA decoding performance.

TABLE 2

| | | 2.25 bits/complex symbol, distance to Shannon SCMA (6 layers, 4 symbols/layer, 3 bits/layer), LDPC (R = 0.5) | | |
|---|---|---|---|---|
| Power Per Layer | Phase Per Layer | Receiver type | Known codebook | Present Codebook with $\alpha$ = 0.74 |
| [0 0 0 0 0 0] dB | U(0, 360) degree | MPA | 8.81 | 7.70 |
| | | MPA + SIC | 6.18 | 5.70 |
| | | MPA + Turbo | 4.07 | 3.55 |
| [0:0.5:2.5] dB | U(0, 360) degree | MPA | 8.27 | 7.69 |
| | | MPA + SIC | 5.80 | 5.75 |
| | | MPA + Turbo | 3.53 | 3.44 |

Figure 7:
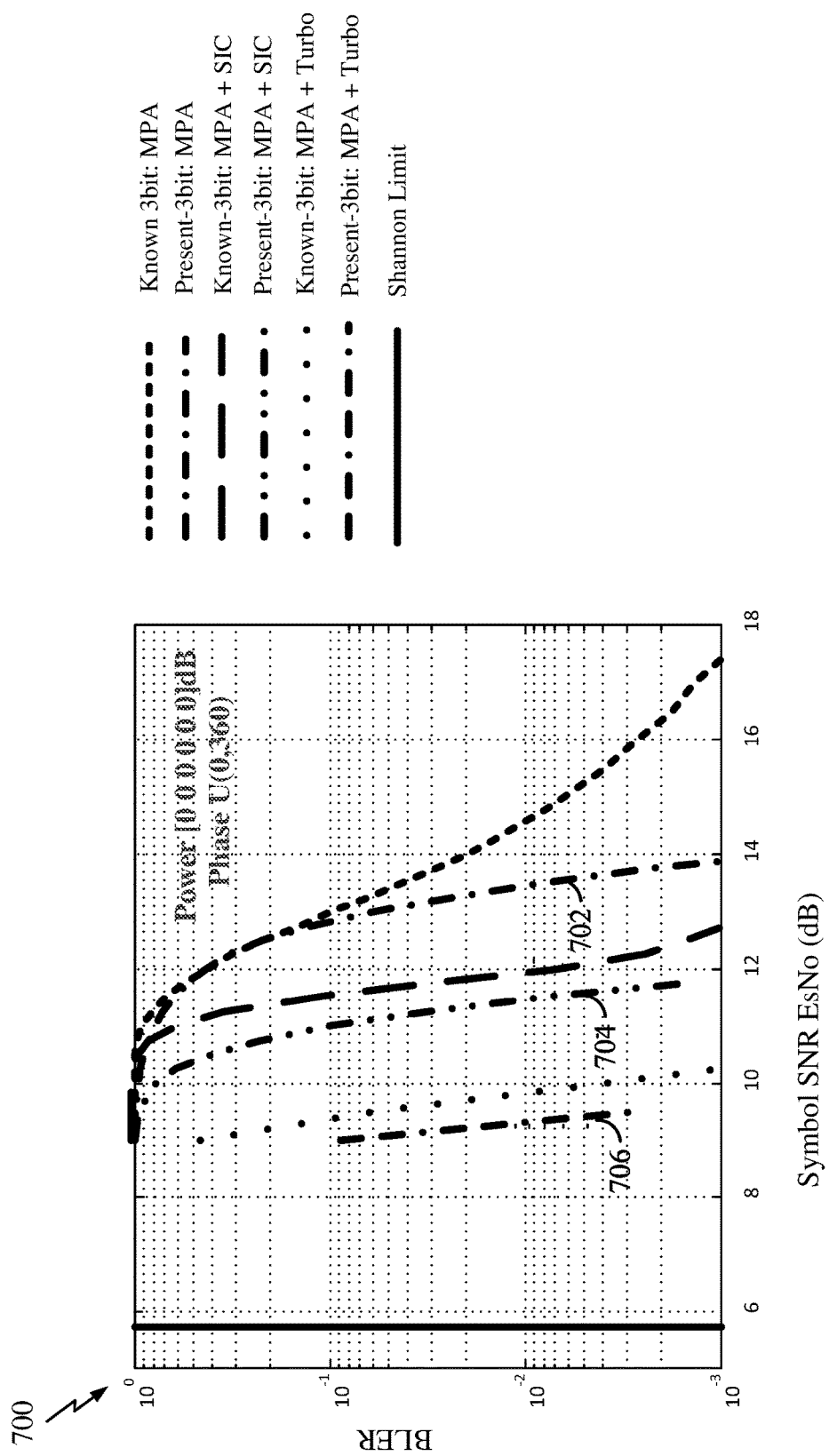
FIG. 7 illustrates a plot of plot of the block error rate (BLER) with respect to the symbol signal to noise ratio (SNR) per bit (i.e., Es/No (Energy per Symbol divided by noise power spectral density)) of the system modelled in FIG. 6.

FIG. 7 illustrates a plot of the block error rate (BLER) with respect to the symbol signal to noise ratio (SNR) per bit (i.e., Es/No (Energy per symbol divided by noise power spectral density)) based on the modelling of FIG. 6 and data of Table 2 above. In particular, FIG. 7 illustrates the performance for the known codebook of FIG. 4 for the various receivers, and a corresponding performance using the presently disclosed codebook, assuming equal power per layer in the model 6-layer system (i.e., [0, 0, 0, 0, 0, 0, 0] dB). As may be seen, each of the plots 702, 704, and 706 for the present codebook illustrate a reduction in the distance to the Shannon limit over the known codebook of FIG. 4 for each of the three exemplary types of receivers.

Figure 8:
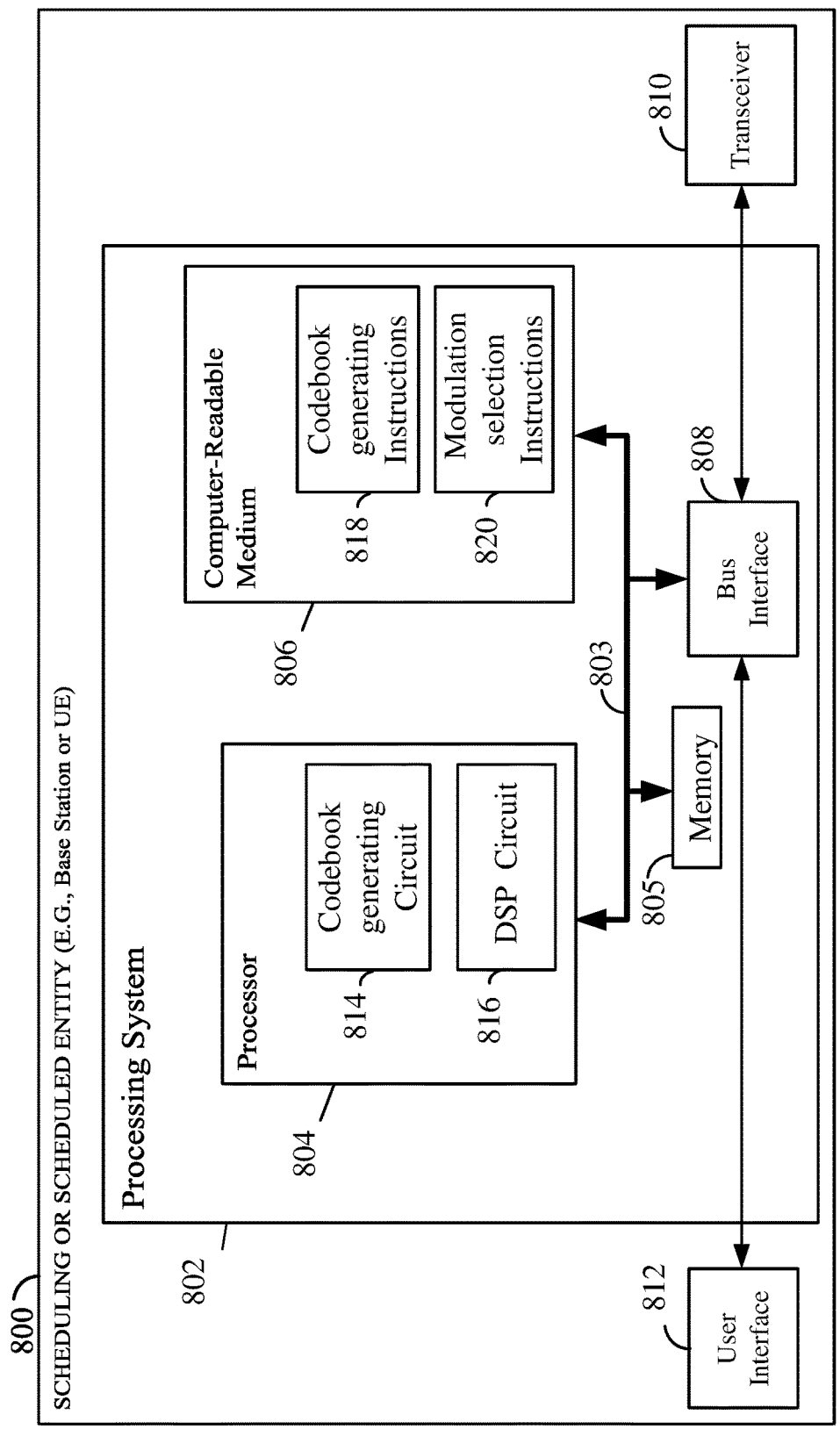
FIG. 8 is a block diagram illustrating an example of a hardware implementation for an apparatus employing a processing system.

FIG. 8 is a simplified block diagram illustrating an example of a hardware implementation for either a scheduling or a scheduled entity 800 employing a processing system 802. In an aspect, the entity 800 may be a user equipment (UE), such as illustrated in FIG. 1 or any entity capable of transmitting data in at least one of a UL or DL direction. It is noted, however, that the entity 800 may also be configured as a scheduling entity, as the presently disclosed concepts may be implemented in a base station or a UE, as examples.

The entity 800 may be implemented with a processing system 802 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 800 may be configured to perform any one or more of the functions described herein. That is, the processor 804, as utilized in a scheduled entity 800, may be used to implement any one or more of the processes described herein for SCMA modulation and spreading.

In this example, the processing system 802 may be implemented with a bus architecture, represented generally by the bus 803. The bus 803 may include any number of interconnecting buses and bridges depending on the specific application of the processing system 814 and the overall design constraints. The bus 803 communicatively couples various circuits including one or more processors (represented generally by the processor 804), a memory 805, and computer-readable media (represented generally by the computer-readable medium 806). The bus 803 may also link various other circuits such as timing sources, peripherals, voltage regulators, and power management circuits, which are well known in the art, and therefore, will not be described any further. A bus interface 808 provides an interface between the bus 803 and a transceiver 810. The transceiver 810 provides a means for communicating with various other apparatus over a transmission medium, and may include at least in part means for transmitting and receiving signals modulated according to SCMA using the presently disclosed codebook. Depending upon the nature of the apparatus, a user interface 812 (e.g., keypad, display, speaker, microphone, joystick) may also be provided.

In some aspects of the disclosure, the processor 804 may include circuitry 814 configured for various functions, including, for example, establishing or generating an SCMA codebook according to the presently disclosed concepts. Additionally, circuitry 814 may communicatively couple with or interface with the transceiver 810 for directing either transmission or reception of signals using the SCMA codebooks disclosed herein. In other aspects of the disclosure, the processor may include DSP circuitry 816 that provides data to be transmitted (or processes data received) with the transceiver 810, such as the input binary bit stream illustrated in FIG. 3, as one example.

The processor 804 is responsible for managing the bus 803 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 802, external to the processing system 802, or distributed across multiple entries including the processing system 802. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include codebook generating or establishing instructions or software 818 configured for various functions, including, for example, establishing an SCMA codebook according the concepts disclosed herein. For example, the codebook generating software may be configured to establish the SCMA codebook including deciding the signature matrix and which constellations are to be used for each non-zero entry in each of the layers.

In a further aspect, the computer-readable storage medium 806 may include modulation selection instructions or software 820 configured for various functions, including, for example, selection of modulation (and encoding) schemes, such as selection of SCMA, and further the selection of which SCMA codebook from a plurality of codebooks, as well as encoding, should be utilized for transmissions by transceiver 810, either for transmission or reception of signals. It is also noted that the entity 800 while described as a scheduled entity, could also be implemented as a scheduling entity as well.

Figure 9:
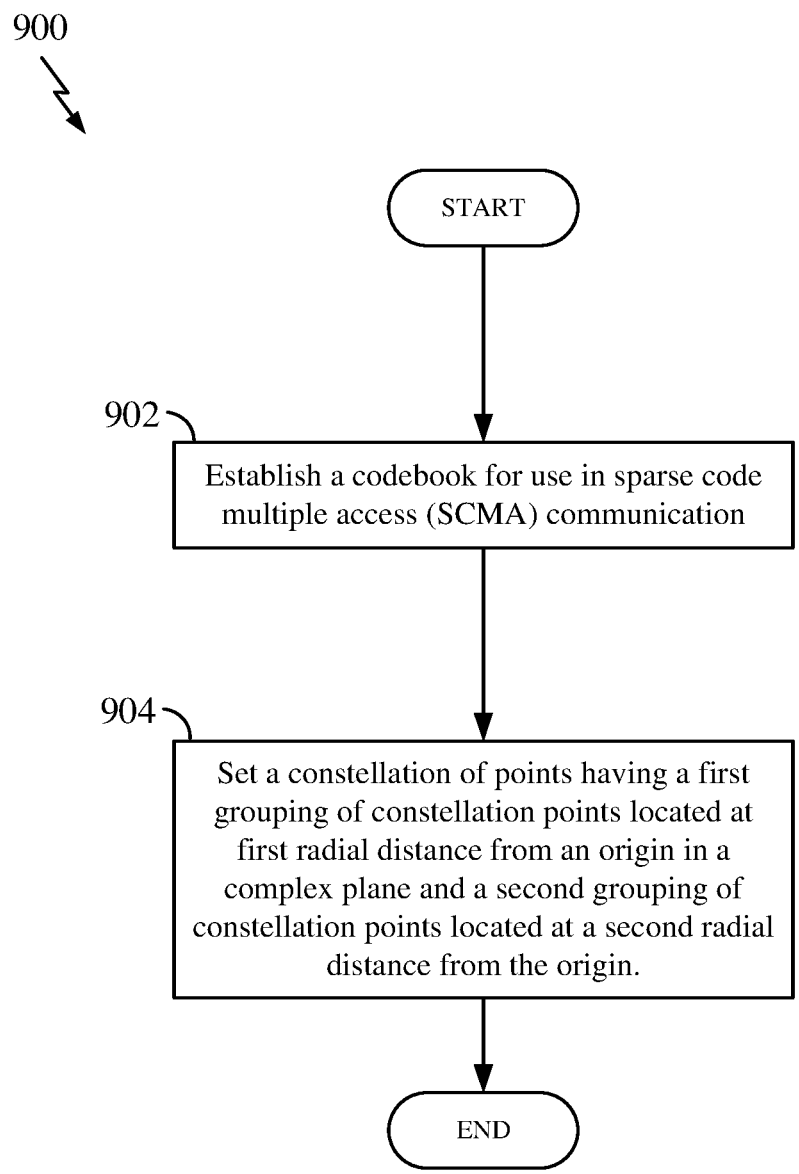
FIG. 9 is a flow diagram of an exemplary method for constructing an SCMA codebook.

FIG. 9 is a flow chart illustrating an exemplary process or methodology 900 for constructing an SCMA codebook in accordance with aspects of the present disclosure. As described below, some or all illustrated features may be omitted in a particular implementation within the scope of the present disclosure, and some illustrated features may not be required for implementation of all embodiments. In some examples, the process 900 may be carried out by the scheduled entity 800 illustrated in FIG. 8. In some examples, the process 900 may be carried out by any suitable apparatus or means for carrying out the functions or algorithm described below.

At block 902, process 900 includes a process for establishing a codebook for use in sparse code multiple access (SCMA) communication, where the codebook used for mapping input bits for transmission to a codeword. The process 900 further includes establishing the codebook by setting the codebook for at least one layer (e.g., for a user or UE) to include a constellation of points having a first grouping of constellation points located or positioned at first radial distance (e.g., one of $R_i$ or $R_o$) from an origin in a complex plane (See e.g., FIG. 5). Further, process 900 includes establishing the codebook by setting a second grouping of constellation points located at a second radial distance from the origin (e.g., the other one of $R_i$ or $R_o$). Additionally, it will be understood that the establishing of the codebook is performed for each layer (i.e., for each UE), and also may be performed among multiple layers (i.e., multiple users).

Although not shown in FIG. 9, the process 900 may further include the constellation of points for at least one layer of communication signal includes a distance between at least one first constellation point in the first grouping of constellation points that is fixed with respect to at least one second constellation point in the second grouping of constellation points according to a predetermined ratio. Further, each of constellation points in the first grouping of constellation points is configured to be closer in absolute distance to an origin point of a plot of the constellation points than each of the points in the second grouping of constellation points to the origin point.

Additionally, process 900 may include that the predetermined ratio is a ratio of a first radius of a first circle equal to the first radial distance around the origin that passes through each of the constellation points in the first grouping of constellation points to a second radius of a second circle equal to the second radial distance around the origin that passes through each of the constellation points in the second grouping of constellation points. According to yet another aspect, the predetermined ratio is set to a value that is less than one. Still further, as described above in connection with FIG. 5, each constellation point represents a predetermined bit value, wherein predetermined bit values for each constellation point are set according to at least one of each layer in a codebook having a plurality of layers, wherein each constellation point in a respective layer may represent a distinct bit value (e.g., the same constellation points in each layer are capable of representing different bit values, although they may also represent the same values as well dependent on the codebook configuration).

According to yet another aspect, the method 900 may include constructing the SCMA codebook such it includes one or more of (1) at least one of the first and second groupings are Gray coded, (2) at least two non-zero entries in a layer are Gray coded, and (3) each layer in a signature matrix is Gray coded with respect to the other layers. Yet further, the method 900 may include the codebook configured to be used in a transmitter system using at least one low-density parity-check (LDPC) encoder and at least one SCMA decoder configured for encoding the input bits for transmission by the transmitter, such as illustrated in the model of FIG. 6 at transmitter 602.

In one configuration, the apparatus 800 for wireless communication includes means for establishing at least one codeword for the codebook configured as a constellation of points having a first group of points located at first radial distance from an origin and a second group of points located at a second radial distance from the origin. In another aspect, the aforementioned means may be the processor(s) 804 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described herein, and utilizing, for example, the processes and/or algorithms described herein in relation to FIGS. 5 and 9.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another, even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in this disclosure may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   establishing a codebook for use in sparse code multiple access (SCMA) communication, the codebook used for mapping input bits for transmission to a codeword including:
   setting the codebook for at least one layer to include:
      a constellation of points having a first grouping of constellation points located at first radial distance from an origin in a complex plane; and
      a second grouping of constellation points located at a second radial distance from the origin;
   wherein the constellation of points for at least one layer of a communication signal includes a distance between at least one first constellation point in the first grouping of constellation points that is fixed with respect to at least one second constellation point in the second grouping of constellation points according to a predetermined ratio.

2. The method of claim 1, wherein each of constellation points in the first grouping of constellation points is closer in absolute distance to the origin point than each of the points in the second grouping of constellation points to the origin point.

3. The method of claim 1, wherein the predetermined ratio comprises a ratio of a first radius of a first circle equal to the first radial distance around the origin that passes through each of the constellation points in the first grouping of constellation points to a second radius of a second circle equal to the second radial distance around the origin that passes through each of the constellation points in the second grouping of constellation points.

4. The method of claim 1, wherein the predetermined ratio is less than one.

5. The method of claim 1, wherein each constellation point represents a predetermined bit value.

6. The method of claim 5, wherein the predetermined bit value for each constellation point is set according to at least one layer in a codebook having a plurality of layers, wherein each constellation point in a respective layer may represent a distinct bit value.

7. The method of claim 5, wherein the codebook includes one or more of:
  1) for each non-zero entry in at least one layer and within the first or second groupings, different constellation points are Gray coded;
  2) for each non-zero entry in at least one layer and between the first and second groupings, constellation points are Gray coded; or
  3) different non-zero entries are Gray coded for each layer.

8. The method of claim 1, wherein the codebook is used in a transmitter system using at least one low-density parity-check (LDPC) encoder and at least one SCMA decoder configured for encoding the input bits for transmission by the transmitter.

9. An apparatus for wireless communication, comprising:
  a processor;
  a transceiver communicatively coupled to the at least one processor; and
  a memory communicatively coupled to the at least one processor,
  wherein the processor is configured to:
    establish a codebook for use in sparse code multiple access (SCMA) communication including establishing a modulation used to construct an SCMA codebook configured as a constellation of points having a first group of points positioned at first radial distance from an origin in a complex plane and a second group of points positioned at a second radial distance from the origin;
    wherein the processor is further configured to establish the constellation of points for at least one layer of a communication signal including a distance between at least one first constellation point in the first grouping of constellation points that is fixed with respect to at least one second constellation point in the second grouping of constellation points according to a predetermined ratio.

10. The apparatus of claim 9, wherein each of constellation points in the first grouping of constellation points is closer in absolute distance to a origin point of a plot of the constellation points than each of the points in the second grouping of constellation points.

11. The apparatus of claim 9, wherein the predetermined ratio comprises a ratio of a first radius of a first circle equal to the first radial distance around the origin that passes through each of the constellation points in the first grouping of constellation points to a second radius of a second circle equal to the second radial distance around the origin that passes through each of the constellation points in the second grouping of constellation points.

12. The apparatus of claim 9, wherein the predetermined ratio is less than one.

13. The apparatus of claim 9, wherein each constellation point represents a predetermined bit value.

14. The apparatus of claim 13, wherein predetermined bit values for each constellation point are set according to at least one layer in a codebook having a plurality of layers, wherein each constellation point in a respective layer may represent a distinct bit value.

15. The apparatus of claim 13, wherein the codebook includes one or more of:
  1) for each non-zero entry in at least one layer and within the first or second groupings, different constellation points are Gray coded;
  2) for each non-zero entry in at least one layer and between the first and second groupings, constellation points are Gray coded; or
  3) different non-zero entries are gray coded for each layer.

16. The apparatus of claim 9, wherein the transceiver includes at least one low-density parity-check (LDPC) encoder and at least one SCMA decoder configured for encoding the input bits for transmission by the transceiver.

17. A non-transitory computer-readable medium storing computer-executable code, comprising code for causing a computer to:
  establish a codebook for use in sparse code multiple access (SCMA) communication including establishing a modulation used to construct an SCMA codebook configured as a constellation of points having a first group of points located at first radial distance from an origin and a second group of points located at a second radial distance from the origin;
  wherein the constellation of points for at least one layer of a communication signal includes a distance between at least one first constellation point in the first grouping of constellation points that is fixed with respect to at least one second constellation point in the second grouping of constellation points according to a predetermined ratio.

18. The non-transitory computer-readable medium of claim 17, wherein each of constellation points in the first grouping of constellation points is closer in absolute distance to a origin point of a plot of the constellation points than each of the points in the second grouping of constellation points.

19. The non-transitory computer-readable medium of claim 17, wherein the predetermined ratio comprises a ratio of a first radius of a first circle equal to the first radial distance around the origin that passes through each of the constellation points in the first grouping of constellation points to a second radius of a second circle equal to the second radial distance around the origin that passes through each of the constellation points in the second grouping of constellation points.

20. The non-transitory computer-readable medium of claim 17, wherein the predetermined ratio is less than one.

21. The non-transitory computer-readable medium of claim 17, wherein each constellation point represents a predetermined bit value.

22. The non-transitory computer-readable medium of claim 21, wherein predetermined bit values for each constellation point are set according to at least one layer in a codebook having a plurality of layers, wherein each constellation point in a respective layer may represent a distinct bit value.

23. An apparatus for wireless communication, comprising:
   means for establishing a codebook for use in sparse code multiple access (SCMA) communication further comprising:
   means for establishing a modulation used to construct an SCMA codebook configured as a constellation of points having a first grouping of constellation points located at first radial distance from an origin in a complex plane and a second grouping of constellation points located at a second radial distance from the origin;
   wherein the constellation of points for at least one layer of communication signal includes a distance between at least one first constellation point in the first grouping of constellation points that is fixed with respect to at least one second constellation point in the second grouping of constellation points according to a predetermined ratio.

24. The apparatus of claim 23,
   wherein each of constellation points in the first grouping of constellation points is closer in absolute distance to the origin point than each of the points in the second grouping of constellation points to the origin point.

25. The apparatus of claim 23, wherein the predetermined ratio comprises a ratio of a first radius of a first circle equal to the first radial distance around the origin that passes through each of the constellation points in the first grouping of constellation points to a second radius of a second circle equal to the second radial distance around the origin that passes through each of the constellation points in the second grouping of constellation points.

26. The apparatus of claim 23, wherein the predetermined ratio is less than one.

27. The apparatus of claim 23, wherein each constellation point represents a predetermined bit value.

28. The apparatus of claim 27, wherein the predetermined bit value for each constellation point is set according to at least one layer in a codebook having a plurality of layers, wherein each constellation point in a respective layer may represent a distinct bit value.

29. The apparatus of claim 27, wherein the codebook includes one or more of:
   1) for each non-zero entry in at least one layer and within the first or second groupings, different constellation points are Gray coded;
   2) for each non-zero entry in at least one layer and between the first and second groupings, constellation points are Gray coded; or
   3) different non-zero entries are gray coded for each layer.

30. The apparatus of claim 23, wherein the means for establishing a modulation used to construct the SCMA codebook is used in conjunction with at least one low-density parity-check (LDPC) encoder and at least one SCMA decoder configured for encoding the input bits for transmission by the apparatus.

* * * * *